Aug. 2, 1955    J. P. MULHALL    2,714,251
ADJUSTABLE TENSION WIRE TYPE CHEESE CUTTER
Filed Jan. 17, 1950    2 Sheets-Sheet 1

Inventor
John P. Mulhall
by Roberts, Cushman & Grover
Att'ys.

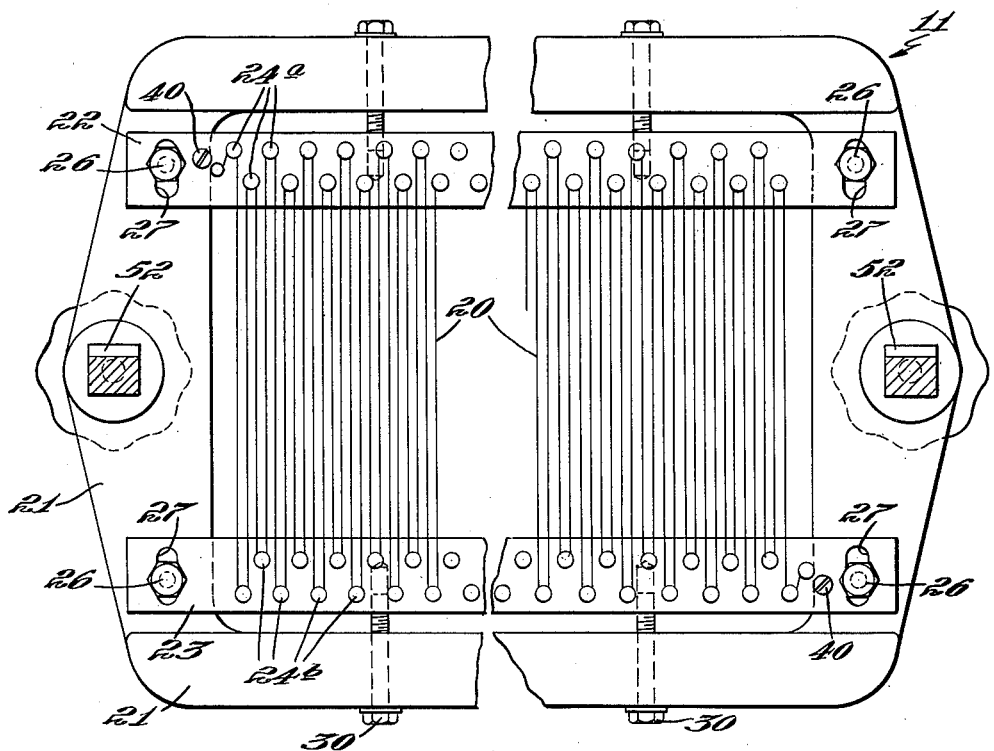
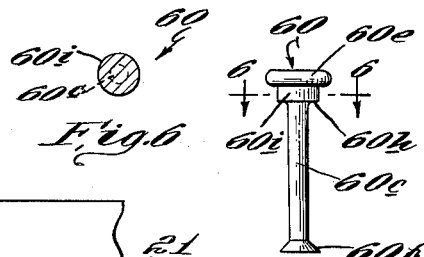
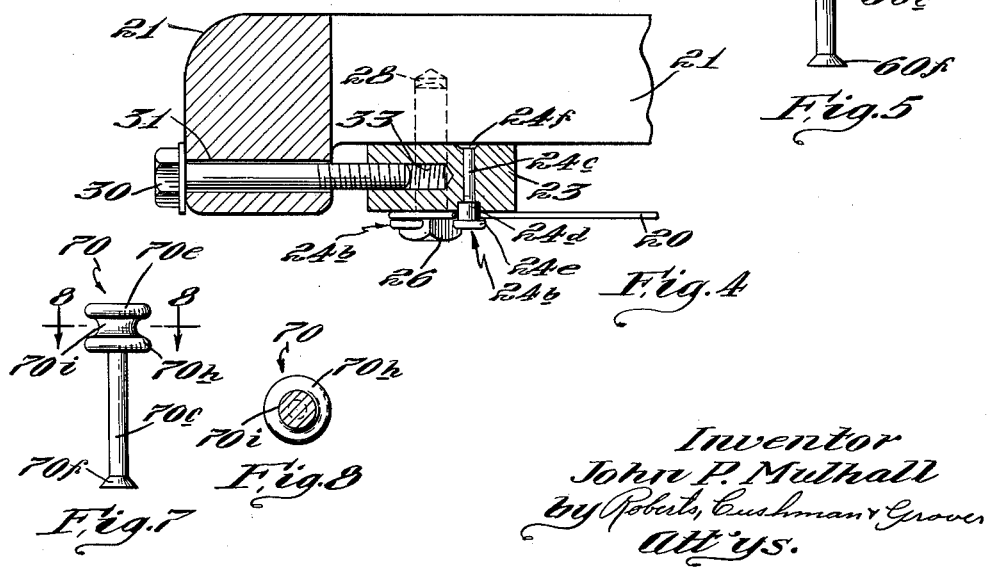

United States Patent Office 2,714,251
Patented Aug. 2, 1955

2,714,251

ADJUSTABLE TENSION WIRE TYPE CHEESE CUTTER

John P. Mulhall, Providence, R. I., assignor to Irving Rubin, Brookline, Mass.

Application January 17, 1950, Serial No. 139,017

7 Claims. (Cl. 31—22)

This invention relates to the support for an elongate cutter member useful for cutting a piece of cheese or similar materials.

The principal object of the invention is to provide a novel apparatus for supporting an elongate cutter element whereby the tension in the elongate cutter element may be varied without removing it from the support.

A further object is to provide a novel elongate cutter element support wherein the cutter element may be readily installed either initially or as a replacement for a broken cutter element.

A further object is to provide an elongate cutter element within the likelihood of fracture of the cutter element during use is reduced.

A further object is to provide an improved cutter support which is economical to manufacture and simple and efficient in operation.

Further objects will be apparent from a consideration of the following description and of the annexed drawings in which three embodiments of my apparatus are chosen for the purpose of illustration.

In the drawings:

Fig. 3 is an enlarged section with parts broken away taken on the lines 3—3 of Fig. 2;

Fig. 4 is an enlarged section taken on the lines 4—4 of Fig. 1;

Fig. 5 is an enlarged side elevation of a modified form of cutter retaining member;

Fig. 6 is a section on the lines 6—6 of Fig. 5;

Fig. 7 is an enlarged section of another modified form of cutter retaining member; and Fig. 8 is a section on the lines 8—8 of Fig. 7.

Figure 1:
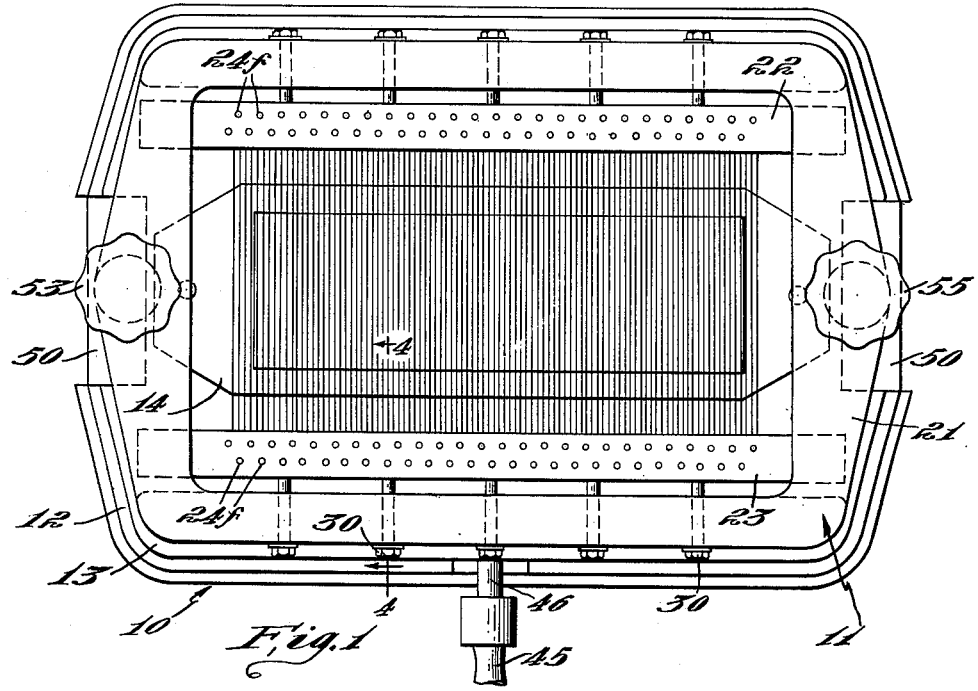
Fig. 1 is a plan view of a cheese cutter embodying my invention.
Figure 2:
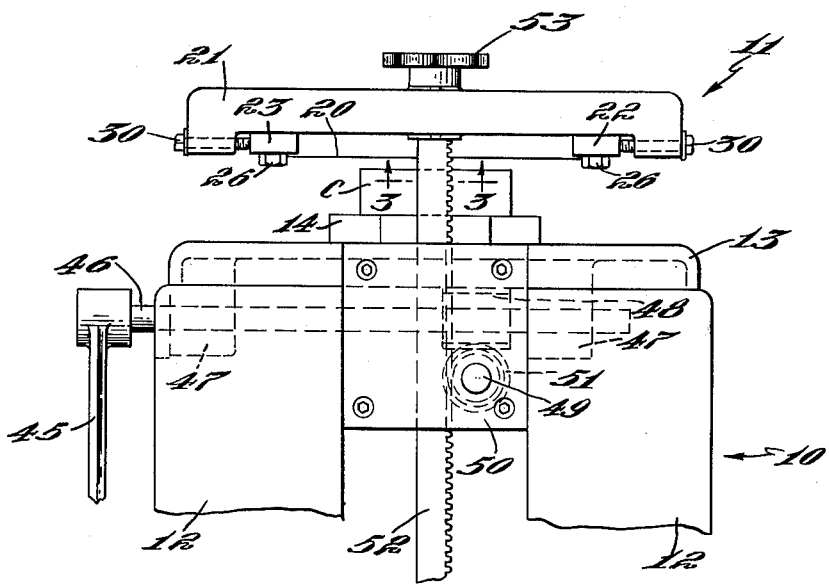
Fig. 2 is an end elevation with parts broken away looking from right to left at the apparatus shown in Fig. 1.

The apparatus comprises a cheese support 10 and a cutter support 11. The cheese support 10 (see Fig. 2) consists of a pair of frame members 12, the lower portions of which are provided with feet (not shown) which may rest upon a table or other support. The frame members 12 are held together in predetermined spaced relationship by the horizontal member 13 which is secured to the side frame members 12 in any suitable manner.

Detachably secured to the top of the table member 13 is a rubber pad 14. Supported upon the surface of this rubber pad is the block of cheese or other material C which is desired to be sliced or cut.

The cutter element consists of an elongate wire 20 made of steel or other suitable material which is mounted upon the lower surface of the cutter support 11. The cutter support comprises a frame member 21, a pair of cutter tensioning members 22, 23 and two series of cutter retaining members, the first series comprising the retaining members 24a and the second series comprising the retaining members 24b, each cutter retaining member is of the identical construction in the embodiment illustrated in Figs. 1 to 4 inclusive.

The cutter tensioning members 22, 23 are secured to the frame member 21 by exteriorly threaded bolts 26, the shanks of which pass loosely through elongate slots 27 provided adjacent to the ends of the cutter tensioning members 22, 23 and the exteriorly threaded portions of which extend into interiorly threaded passages 28 which are provided in the frame member 21 (Fig. 4). The longitudinal center line of each slot 27 preferably is substantially perpendicular to the longitudinal center line of the cutter tensioning member.

The movement of the cutter tensioning members 22, 23 toward and away from each other may be effected by means of a series of bolts 30 the shank of each of which passes loosely through a passage 31 (Fig. 4) which extends through the frame member 21 and the threaded end portion of the bolt is received by an interiorly threaded passage 33 provided in the cutter tensioning member 22 or 23 as the case may be. Thus, by loosening the bolts 26 sufficiently to relieve the friction of their heads upon the adjacent surfaces of the cutter tensioning members 22, 23, the tensioning members may be moved toward or away from each other by rotating the bolts 30.

In the embodiment illustrated in Figs. 1 to 4 inclusive of the drawings, each cutter retaining member comprises a shank 24c (Fig. 4) which passes through a transverse passage in the cutter tensioning member with which it is associated, an enlarged outer shank portion 24d the upper portion of which is received in a cylindrical chamber provided in the lower portion of the cutter tensioning member and a head portion or flange 24e which is adjacent to the outer end of the enlarged portion 24d. The cutter retaining members are normally secured in position by swaging their upper ends as shown at 24f into a suitably shaped recess provided in the upper surface of the cutter tensioning members 22, 23.

The cutter retaining members 24a—24b are so constructed that the distance between the lower surface of the cutter tensioning member with which they are associated and the upper face of the flange 24d is slightly greater than the diameter of the elongate cutter member 20; accordingly, when the elongate cutter member 20 is arranged as illustrated each loop between a pair of straight portions of the wire cutter member is free to move longitudinally along the arcuate wall portion of the shank 24d with which it is in engagement when the tension in the cutter member is varied.

The free ends of the elongate cutter member 20 are anchored or held by the bolts 40, the threaded shanks of which are received in interiorly threaded passages in the cutter tensioning members 22, 23. The ends of the cutter member 20 are looped around the shanks of the bolts 40, the bolts are then tightened so that the ends of cutter member are frictionally held or pinched between the lower surface of the head of the bolt and the adjacent surface of the cutter retaining member.

In the embodiment illustrated, the cutter support 11 is actuated downwardly and upwardly (toward and away from the cheese support 10) by manual rotation of the crank 45. The crank 45 is secured to the shaft 46 which is mounted for rotation in bearings 47. Attached to the shaft 46 intermediate its ends is a worm gear 48. This worm gear meshes with the teeth of a gear (not shown) which is attached to the horizontal shaft 49. The horizontal shaft 49 extends from end to end of the cheese support 10 and it is mounted for rotation in suitable bearings 50. Attached adjacent to the outer ends of the shaft 49 are a pair of pinions 51, the teeth of which mesh with the teeth of the racks 52. The upper end of each rack 52 is detachably secured to the cutter support 11 by means of a nut 53 which is provided with an interiorly threaded passage (not shown) to receive the exteriorly threaded end of a shaft which extends upwardly from the upper end of the rack 52.

Thus, as the handle 45 is rotated in an appropriate direction the teeth of worm 48 acting against the teeth of the gear which is attached at the center of the shaft 49 causes the shaft 49 to be rotated. Such rotation causes rotation of the pinions 51 and the engagement of the teeth of the pinions 51 with the teeth of the racks 52 causes the cutter support 11 to be progressively lowered until the elongate cutter element 20 has passed completely through the block of cheese C and caused slight depression of the rubber pad 14. By rotating the handle in the opposite direction the cutter support is then elevated until the cutter element 20 is above the upper surface of the cheese. The slices of cheese may then be removed and a fresh block of cheese inserted.

To initially install the elongate cutter element 20 one end thereof may be secured by tightening one of the bolts 40 and the cutter element 20 is then manually arranged in a plurality of straight portions which extend transversely of the opening between the cutter tensioning bars 22, 23 substantially in a single plane, with a loop between each pair of adjacent straight portions. Each loop extends longitudinally of and in engagement with the arcuate wall portion of a cutter retaining member 24a or 24b. The other end of the cutter 20 is then secured by means of the other bolt 40 and the tension in the elongate cutter element may be adjusted to the desired amount by rotation of one or more of the bolts 30, thus actuating one or both of the cutter tensioning members 22 or 23 and moving the series of cutter retaining members 24a or 24b toward or away from the other series. During such tension adjusting operation as pointed out above, each loop portion of the cutter member is free to move longitudinally of the arcuate wall portion of the cutter retaining member with which it is associated and thereby the snapping or fracture of the straight portions of the elongate cutter is prevented. After the desired adjustment has been made the bolts 26 are tightened to more firmly hold the cutter tensioning members in final adjusted position.

The cutter retaining member 60 illustrated in Figs. 5 and 6 differs from that illustrated in Figs. 1 to 4 inclusive in that the shank 60c extends to the shoulder 60h which is provided at one end of the cutter reeciving wall portion 60i, the height of the wall portion 60i being slightly greater than the diameter of the elongate cutter member 20 and this height is defined by the vertical distance between the outer flange 60e and the shoulder 60h. To assemble this type of cutter retaining member, the shank 60c is passed through a transverse passage in the cutter tensioning member 22 or 23 with which it is to be associated and the upper end 60f is swaged as in the case of the cutter retaining members 24a and 24b. The shoulder 60h in this case however is flush with and abuts the adjacent surface of the cutter tensioning member 22 or 23 and the transverse passage in the cutter tensioning member having a bore of three different diameters is eliminated, said transverse passage being of a diameter slightly greater than the diameter of the shank 60c throughout its length except for the tapered portion at the upper end for receipt of the swaged portion 60f.

The cutter retaining member 70 illustrated in Figs. 7 and 8 of the drawings is the same as that illustrated in Figs. 5 and 6 of the drawings except that the cutter receiving wall portion 70i is arcuate in transverse section as illustrated in Fig. 7 rather than being in the form of a straight line as illustrated in Fig. 5 and an inner flange 70h is provided. The flat face of the flange 70h abuts the bottom face of the cutter tensioning member 22 or 23 when installed in a manner similar to the abutment of the wall portion 60h in the embodiment illustrated in Figs. 5 and 6.

From the foregoing it will be apparent that this invention provides a novel apparatus for supporting an elongate cutter element whereby the tension in the elongate cutter element may be varied without removing it from the support, wherein the cutter element may be readily installed either initially or as a replacement for a broken cutter element, wherein the likelihood of fracture of the cutting element during use is reduced because it is free to more longituidnally of the cutter receiving wall portions of the cutter retaining members and wherein the tension of the elongate cutter element may be manually adjusted without resort to movement of the cutter tensioning member by merely loosening one of the bolts 40, pulling the end of the cutter member which is normally located beneath said bolt and thereafter tightening the bolt 40.

It will also be apparent to persons skilled in the art that this invention provides a cutter support which is economical to manufacture and simple and efficient in operation.

The invention is not limited to the use of two cutter tensioning members. For example, the series of cutter retaining members 24a may be secured to the frame member 21 adjacent to one side of the opening (either by making the cutter tensioning member 22 integral with the frame member 21 or otherwise), thus eliminating the movable cutter tensioning member 22. The tension in the cutter member 20 may then be adjusted by lateral movement of the cutter tensioning member 23.

The invention is not limited to the use of a plurality of adjusting bolts 30, one bolt located intermediate the ends of the cutter tensioning member may be utilized, although it is preferred to use a plurality of such bolts.

The invention is not limited to the use of the particular arrangement for moving the cutter support toward and away from the cheese support. Any other arrangement may be used, for example, a cutter support which is rotated about a horizontal axis.

While I have shown and described three desirable embodiments of apparatus embodying my invention, it is to be understood that this disclosure is for the purpose of illustration only and that various forms of the apparatus may be used without departing from the spirit and scope of the invention as set forth in the appended claims.

I claim:

1. A cutter support comprising a frame member having a transverse opening therein of sufficient size to receive a piece of cheese to be sliced, two series of cutter retaining members on said frame member, one of said series being located adjacent to one side of said opening and the other adjacent to the opposite side thereof, each of said cutter retaining members having a cutter receiving wall portion which is convexly arcuate at least on the side of the cutter retaining member which is away from said opening and each of said cutter retaining members having a flange at the side of said convexly arcuate wall portion which is spaced outwardly from the frame member, the portion of the cutter retaining member which extends from said cutter receiving wall portion towards said frame member having a smaller cross sectional area than the cross sectional area of the cutter receiving portion and an elongate cutter member comprising a wire having each end anchored and having the portion intermediate its ends arranged in a plurality of straight portions which extend transversely of said opening substantially in a single plane with a loop between each pair of adjacent straight portions, each of said loops extending longitudinally of and in engagement with said arcuate wall portion of a cutter retaining member and being free of attachment thereto, whereby each loop portion of the cutter member is free to move longitudinally of an arcuate wall portion of a cutter retaining member when the tension in said straight portions of the cutter member is varied and each loop portion of the cutter member is prevented from moving outwardly away from the frame member by said flange.

2. The combination of claim 1 wherein the cutter member comprises a length of wire which is substantially circular in cross section, the arcuate wall portion of each cutter retaining member is bounded by a pair of spaced flanges which are located at the opposite sides of the arcuate wall portion and are spaced apart a distance which is slightly greater than the diameter of the cutter member whereby said abutment members limit movement of the loop portion of the cutter member laterally of said arcuate wall portion but permit free movement thereof longitudinally of said arcuate wall portion.

3. The combination of claim 1 wherein the cutter member comprises a length of wire which is substantially circular in cross section and the arcuate wall portion of each cutter retaining member consists of the bottom wall of a groove formed in the cutter retaining member, said bottom wall being convexly arcuate longitudinally thereof whereby the loop portion of the cutter member while in engagement with said bottom wall is free to move longitudinally of the groove.

4. The combination of claim 1 wherein the cutter member comprises a length of wire which is substantially circular in cross section and the arcuate wall portion of each cutter retaining member consists of the bottom wall of a groove formed in the cutter retaining member, said bottom wall being concavely arcuate in cross section and convexly arcuate in longitudinal section, whereby the loop portion of the cutter member while in engagement with said bottom wall is free to move longitudinally of the groove.

5. The cutter support of claim 1 wherein said retaining means of each series is arranged in two staggered rows.

6. A cutter support comprising a frame member having a transverse opening therein of sufficient size to receive a piece of cheese to be sliced, a first series of cutter retaining members on said frame member adjacent to one side of said opening, a cutter tensioning member adjacent to the opposite side of said opening, a second series of cutter retaining members on said cutter tensioning member, means for detachably securing said cutter tensioning member to said frame member for movement thereof toward and away from said first series of cutter retaining members, adjusting means associated with said frame member and said tensioning member for moving said tensioning member toward and away from said first series of cutter retaining members, each of said cutter retaining members having an arcuate cutter receiving portion on the side of the cutter retaining member which is away from said opening, and an elongate cutter member having the portion intermediate its ends arranged in a plurality of straight portions which extend transversely of said opening substantially in a single plane with a loop between each pair of adjacent straight portions, each of said loops extending longitudinally of and in engagement with a cutter receiving wall portion of a cutter retaining member and being free of attachment thereto, whereby each loop portion of the cutter member is free to move longitudinally of an arcuate wall portion of a cutter retaining member and the tension in said straight portions of the cutter member may be adjusted by actuation of said adjusting means and corresponding movement of said cutter tensioning member, the portion of said cutter retaining member which extends from the said cutter receiving wall portion towards the said frame member having a smaller cross-sectional area than the cross-sectional area of the cutter receiving portion.

7. The cutter support of claim 6 wherein said retaining means of each series is arranged in two staggered rows.

References Cited in the file of this patent

UNITED STATES PATENTS

| Number | Name | Date |
| --- | --- | --- |
| 20,750 | Warner | June 29, 1858 |
| 198,892 | Magers | Jan. 1, 1878 |
| 893,591 | Larsen | July 14, 1908 |
| 903,981 | Jacobsen | Nov. 17, 1908 |
| 998,722 | Stewart | July 25, 1911 |
| 1,042,257 | Oliver | Oct. 22, 1912 |
| 1,370,158 | Ruttle | Mar. 1, 1921 |
| 1,615,308 | Merrill | Jan. 25, 1927 |
| 1,653,578 | Larsen | Dec. 20, 1927 |
| 2,333,855 | Gascoigne | Nov. 9, 1943 |
| 2,405,311 | Livadas | Aug. 6, 1946 |
| 2,472,699 | Gangemi | June 7, 1949 |
| 2,592,657 | Cierley | Apr. 15, 1952 |